US006266186B1

(12) United States Patent
Greiner (10) Patent No.: US 6,266,186 B1
(45) Date of Patent: Jul. 24, 2001

(54) CREATIVE ART KIT FOR PRODUCING AND VIEWING STEREOSCOPIC CREATIVE ART IMAGES

(75) Inventor: Marcia L. Greiner, Lafayette, CO (US)

(73) Assignee: Pumpkin Ltd., Denver, CO (US)

( * ) Notice: Subject to any disclaimer, the term of this patent is extended or adjusted under 35 U.S.C. 154(b) by 0 days.

(21) Appl. No.: 09/190,356

(22) Filed: Nov. 12, 1998

(51) Int. Cl.$^7$ .................................................. G02B 27/22
(52) U.S. Cl. .......................... 359/466; 359/464; 359/477
(58) Field of Search .................................... 359/464, 466, 359/474, 477

(56) References Cited

U.S. PATENT DOCUMENTS

| | | | |
|---|---|---|---|
| 3,581,882 | * 6/1971 | Bish | 206/1.7 |
| 3,849,911 | * 11/1974 | Longenecker | 434/84 |
| 4,025,666 | * 5/1977 | Pierce | 427/197 |
| 4,597,634 | 7/1986 | Steenblik . | |
| 4,620,770 | * 11/1986 | Wexler | 359/464 |
| 4,708,817 | * 11/1987 | Dudnick | 252/301.16 |
| 4,717,239 | * 1/1988 | Steenblik | 359/464 |
| 5,002,364 | 3/1991 | Steenblik . | |
| 5,460,087 | * 10/1995 | Ogorzalek | 101/128.21 |
| 5,482,510 | * 1/1996 | Ishii et al. | 472/61 |
| 5,542,640 | * 8/1996 | Tarozzi | 248/460 |
| 5,546,198 | 8/1996 | Van Der Gracht et al. . | |

OTHER PUBLICATIONS

Neufeldt, Victoria. Webster's New World Dictionary Third College Edition. Simon & Schuster, Inc., New York, New York, p. 43, Dec. 1988.*

Photocopy of Jumping Colors™ By Crayola, A Trademark of Binney and Smith, Inc. of Easton, PA 18044–0431 Dec. 1994.

* cited by examiner

*Primary Examiner*—Cassandra Spyrou
*Assistant Examiner*—Jennifer Winstedt
(74) *Attorney, Agent, or Firm*—Timothy J. Martin; Michael R. Henson; Mark H. Weygandt (57) ABSTRACT

A creative art kit is provided for producing and viewing stereoscopic images. The kit includes a pigmented medium that is adapted to be applied to a surface and which includes a luminescent material as a component thereof. The kit also includes a viewer through which a user may observe the images, and which has an optical element that is operative to disperse wavelengths of light passing therethrough at different dispersion angles depending on the spectral position of each wavelength. The kit may further be provided with various pigmented media, applicators, stencils, and instructions for producing and viewing the images. In addition, the present invention is directed to a method for producing and viewing stereoscopic images, which comprises the steps of applying a pigmented medium that includes a luminescent material to a surface in a selected design and viewing the surface and the design through a viewer. The present invention is further directed to a system for viewing stereoscopic images, which comprises an image that has at least one luminescent colored portion and a viewing apparatus for viewing the image.

33 Claims, 4 Drawing Sheets

CREATIVE ART KIT FOR PRODUCING AND VIEWING STEREOSCOPIC CREATIVE ART IMAGES

FIELD OF THE INVENTION

The present invention is directed to the creation and viewing of images, especially stereoscopic images which provide a three-dimensional perceptual effect when viewed with an apparatus particularly adapted therefor. The present invention more particularly concerns a creative art kit containing a complete ensemble of the elements necessary for producing and viewing stereoscopic images. A method for producing and viewing, and a system for viewing, such stereoscopic images is also provided.

BACKGROUND OF THE INVENTION

People have utilized creative art drawing and painting as a means of expression throughout history. From the early cave paintings of prehistoric times to the various methods of artistic expression developed throughout the ages, humans have created and modified forms of artistic expression to suit their talents, personal preferences and needs for expression. Some forms have been simple drawings, such as those produced by small children painting with their fingers, while others have been exotic, intricate works created by professional artists and embodying a variety of ways of perceiving and depicting images of real and imagined scenes.

Generally, such paintings are created on two dimensional pieces of canvas, parchment or paper, or other surfaces, by applying paints, chalks, or other pigmented media of color to create an image to the satisfaction of the artist. Because of the limitations of depicting a three dimensional world in two dimensions, there has been a movement to create two dimensional images having a three dimensional effect.

Attempts to create such an effect have occurred through the use of texturing portions of an image in accordance with the desired depth appearance, through studies in the use of perspective and shading, through the creation of computer generated images embodying three dimensional effects, through the use of images viewed differently by each eye of the beholder, and through other means intended to create the perception of depth within the image.

Unfortunately, many of these means are complicated and require great skill or time, or require expensive and complicated equipment to create them. The average person or child wanting to create an image having a three dimensional effect cannot easily or quickly create such a design. Accordingly, there has been a long felt need for a simple and quick method for creating dramatic three dimensional effects in images that is not dependent upon the artistic skill or technological aptitude of the artist involved.

One means for addressing this need can be found in the development of simple, color-based images viewed with specialized stereoscopic apparatus. For example, U.S. Pat. Nos. 4,717,239 and 4,597,634, both to Steenblik, teach a stereoscopic process and apparatus for viewing stereoscopic images. The apparatus may include either diffractive or refractive elements, or both. The Steenblik patents teach that diffractive or refractive elements may be used to bend light of different colors to different degrees, such that portions of an image of one color will appear to a person looking through the element to be at a depth different than portions of the image of another color, as a result of the difference between the amount of angular deflection of the light rays of each color. Accordingly, a three dimensional effect may be generated through the use of a diffracting or refracting element in combination with a single or multi-color image.

Steenblik teaches that the most notable three dimensional effect is observed when colors that are far apart in the visible spectrum are used in the image. Steenblik showed that the greatest degree of separation of image portions occurs when one portion is colored red and another portion is colored blue. When viewed through a prism, a portion of the image which is colored red can be made to appear more distant than the portion of the image which is colored blue, as a result of the angular deflection of wavelengths of blue and red light relative to each other. Other portions of the image may be made to appear at intermediate distances by using intermediate colors such as yellow and green.

Attempts have been made to incorporate the process and apparatus taught by Steenblik into commercial items for drawing or painting creative art images. A stereoscopic apparatus similar to that taught by Steenblik was used in a product sold under the name Crayola®, a trademark of Binney and Smith of Easton, Pa. This product incorporated a box of markers and a stereoscopic viewing apparatus having diffractive elements. When images were drawn with the markers, however, it was noticed that very little, if any, separation of the depth of colors was observed with the viewing apparatus.

Another product incorporating a stereoscopic apparatus was used in a product sold under the name SpiroGraph® a trademark of Hasbro, Inc., of Pawtucket, R.I. This product incorporated a red pen and a blue pen for drawing images which could be viewed with a stereoscopic apparatus such as that taught by Steenblik. Again, however, very little, if any, impact of three dimensional perception was observed. Several other manufacturers have also attempted to incorporate products using various colored drawing media and stereoscopic apparatus with little or no success. Accordingly, it can be seen that there is a need for a system for creating and viewing stereoscopic images which provides a high degree of three dimensional separation of image portions, and which can be supplied in a commercial product that allows simple and quick creation of such images.

The present invention, therefore, is directed to a stereoscopic system for quickly and easily creating and viewing images having a high degree of three dimensional perception. The present invention is also directed to the presentation of this system and articles for practicing it in a kit form for creating designer art images having stereoscopic properties, regardless of the level of artistic skill or technical aptitude of the artist. The present invention is also directed toward a method for producing and viewing, as well as a system for viewing, such stereoscopic creative art images.

SUMMARY OF THE INVENTION

It is an object of the present invention to provide a new and useful creative art kit containing elements necessary for producing and viewing stereoscopic creative art images having a high degree of three-dimensional depth and separation of colors.

It is another object of the present invention to provide a creative art kit which includes elements that are an improvement over earlier products for viewing stereoscopic images.

It is a further object of the present invention to provide a new and useful method for producing and viewing stereoscopic creative art images having a greater three dimensional effect than earlier methods.

It is still a further object of the present invention to provide a system for viewing stereoscopic images having an image and a viewing means therefor, which provides a high degree of three dimensional depth and separation.

It is a further object of the present invention to provide a kit including a complete ensemble of elements allowing creation of images having dramatic stereoscopic effects that are not dependent upon the artistic skill or technical aptitude of the artist.

It is still a further object of the present invention to provide a kit for producing stereoscopic images that is usable by small children, and which can provide an exciting, interesting artistic activity for such children.

To accomplish these objects, this invention provides a creative art kit adapted for use in producing and viewing stereoscopic images. The kit includes a pigmented medium that is adapted to be applied to a surface to produce images. The pigmented medium includes a luminescent material as a component thereof. Preferably, the luminescent material is a fluorescent material. The kit also includes a viewer through which a user may observe the images. The viewer includes an optical element which is operative to disperse wavelengths of light passing therethrough at different dispersion angles depending upon the spectral position of each wavelength. The kit may also include one or more applicators, stencils and instructions.

The present invention is also directed to a method for producing and viewing stereoscopic images that includes the step of applying a first pigmented medium of a chosen color to a surface in a selected design. A luminescent material is included as a component of the first pigmented medium. Preferably, the luminescent material is fluorescent. The method also includes the step of viewing the surface and design of the first pigmented medium through a viewer having a viewing portion that is operative to impart an angular deviation to light of the chosen color passing through the viewing portion.

The present invention also is directed to a system for viewing stereoscopic images that includes an image to be viewed having one or more luminescent colored portions. The luminescent colored portions are preferably fluorescent colored portions. The system also includes a viewing apparatus for viewing the image. The viewing apparatus is operative to angularly deflect light of a first chosen color relative to light of a second chosen color. This deflection of light imparts to a person viewing the image an appearance of depth to the first chosen color relative to the second chosen color.

These and other objects of the present invention will become more readily appreciated and understood from a consideration of the following detailed description of the exemplary embodiment(s) when taken together with the accompanying drawings, in which:

DETAILED DESCRIPTION OF THE EXEMPLARY EMBODIMENT(S)

The present invention is directed to a creative art kit which provides an ensemble of elements for producing and viewing stereoscopic creative art images according to the present invention. As such, the kit according to the present invention includes at least a viewer and a pigmented medium, where the pigmented medium has a luminescent material as a component thereof.

It has been discovered that luminescent materials, especially those which contain fluorescent compounds, impart a greater degree of three dimensional depth and color separation than do non-luminescent colors. A fluorescent color is one which displays a property of luminescence wherein an atom of the substance emits photons of electromagnetic energy when returning to a ground state after having been in an excited state as a result of excitation by a photon, electron, or chemical reaction, and wherein the luminescence does not persist significantly after the exciting cause is removed. In the case of many fluorescent materials, the exciting cause is a photon having a wavelength in the ultraviolet (UV) spectrum, which causes the emission of a photon in the visible spectrum when the electron returns to the ground state.

Accordingly, it can be seen that fluorescent and other luminescent materials are brighter than non-fluorescent (or non-luminescent) materials. This extra degree of intensity results from the light reflected from the material in addition to light emitted from the material in accordance with the above-described process. Therefore, it should be appreciated that other materials having luminescent properties equivalent to those of fluorescent materials may also give a greater degree of three-dimensional perceptional separation, similarly to fluorescent materials. Thus, luminescent materials such as fluorescent materials, phosphorescent materials and materials displaying luminescence through photoluminescence, electroluminescence, chemolumininescence, and biolumininescence, wherein the luminescence increases the intensity of color, are all believed to give a greater degree of depth and color separation.

The ordinarily skilled artisan will be familiar with materials having fluorescent and other luminescent properties. Some examples of fluorescent materials include pigments, such as amino nitrene formaldehyde resins, which display fluorescent properties of emitting visible light after absorbing light in the UV wavelengths. An example of phosphorescent materials arises in substances containing copper doped zinc molecules, which store energy absorbed from UV light and release it over time. Numerous publications in the art further describe materials having luminescent properties.

Through the application of fluorescent and other luminescent materials, this invention improves the three-dimensional separation experienced with earlier products utilizing the process and apparatus taught in the Steenblik patents. Diffraction or refraction in combination with fluorescent or other luminescent materials thereby gives a high degree of three-dimensional perception when utilizing a stereoscopic viewing apparatus therewith.

In accordance with the invention, then, a creative art kit is provided which is adapted for use in producing and viewing stereoscopic images. The creative art kit broadly comprises at least one pigmented medium adapted to be applied to a surface to produce images, where the pigmented medium includes a luminescent material as a component thereof, and, at least one viewer through which a user may observe the images, each viewer including at least one optical element which is operative to disperse wavelengths of light passing through the optical element at different dispersion angles depending upon the spectral position of each wavelength of light. The kit may also include at least one applicator useful for applying the pigmented medium to a chosen surface, at least one stencil having a selected design therein whereby the pigmented medium can be applied over the stencil to transfer the selected design to the surface, and instructions teaching a method for producing and viewing stereoscopic creative art images.

In the preferred embodiment of the present invention, the creative art kit is in the form of a self-contained package including an ensemble of elements for producing and viewing a stereoscopic image. Preferably, the kit includes at least one viewer which comprises an eye-glass frame supporting the optical element. The optical element is either a diffractive element or a refractive element, such as a diffraction grating or prism, respectively. Preferably, the optical element comprises a light-weight, high efficiency diffraction grating. The making of such diffractive and refractive elements is known in the art.

In the preferred embodiment, multiple colors of a fluorescent, or other luminescent, pigmented medium are provided in receptacles therefor included in the creative art kit. Further preferred is that the colors of the pigmented medium comprise colors which extend across the visible spectrum of colors. These include colors such as yellow, red, pink, orange, blue, purple, green, and other colors. It is contemplated that the kit may include only one color of the pigmented medium, or several colors of the pigmented medium, including colors from each relative end of the visible spectrum of colors. The colors chosen for the kit from the relative red end of the spectrum are preferably yellow, red, pink and orange. The colors chosen for the kit from the relative blue end of the spectrum are preferably blue, purple and green. It should be appreciated that other colors may be available.

In general, the colors tending toward the relative red portion of the visible spectrum will appear less distant to the optical element when viewed therethrough. Conversely, colors tending toward the relative blue portion of the visible spectrum will appear generally more distant to the optical element when viewed therethrough. It should be appreciated, however, that optical elements may be constructed which reverse the angular deflection of light waves passing therethrough, as taught by the Steenblik patents, such that colors tending toward the red portion of the visible spectrum may appear more distant and colors tending toward the relative blue portion of the visible spectrum may appear less distant.

The pigmented medium may comprise finger paint, poster paint, chalk or dust. Pigmented media comprising dust includes solid material—as opposed to liquid—in powdered form, such as chalk dust. It is also contemplated that the pigmented medium may include items such as luminescent paper of different colors, which could be cut into desired configurations to be taped, pasted, stapled, etc. into an image. It is contemplated that either a single one of these types or combinations of these types of pigmented medium may be included in the kit. The pigmented medium may be in the form of a powdered solid to be mixed with a liquid such as water to produce a flowable compound. Preferably, the pigmented medium comprises one or more liquid paint-type materials of various colors.

Preferably, the creative art kit further includes at least one applicator adapted for use in applying the pigmented medium to a chosen surface. Where the kit includes more than one applicator, it is contemplated that each applicator may have different characteristics for the manner in which they apply the pigmented medium. For example, brushes having bristle portions of different shape and size may be provided so as to provide flexibility for the user in applying the pigmented medium. Preferably, the applicator is a brush of the paint brush variety useful in applying a liquid paint material to a surface.

It is also contemplated that the kit may further include at least one non-luminescent pigmented medium. Such non-luminescent media may be provided in a variety of colors. Preferably, the non-luminescent media have a high contrast to the luminescent media; however, non-luminescent media of many colors along the visible spectrum are contemplated. It should be noted that at least one of the colors of the pigmented medium provided in the kit includes a luminescent, preferably fluorescent, material as a component thereof.

Further, it is preferred that the creative art kit also includes instructions for teaching a method for producing and viewing stereoscopic creative art images. Also, it is preferred that the creative art kit include one or more stencils having selected pre-constructed designs therein which may be used, in combination with the pigmented medium, for transferring the selected design to the surface by applying the pigmented medium over the stencil.

Figure 1:
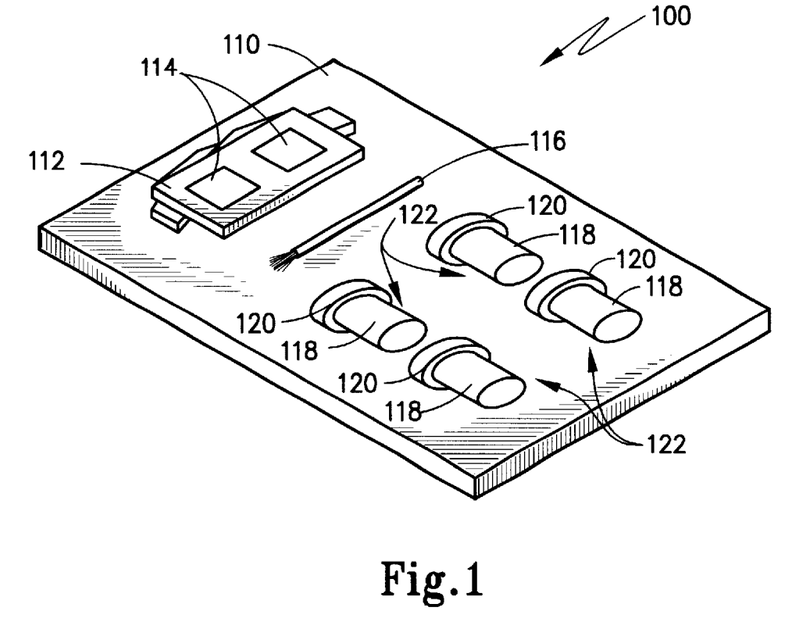
FIG. 1 is a perspective view of an exemplary embodiment of the creative art kit of the present invention.

As is shown in FIG. 1, then, creative art kit 100 is shown in its packaged form including a viewer 112, applicator 116 and pigmented medium 122. The elements of the creative art kit are removably attached to backing 110. Viewer 112 includes optical elements 114. It should be noted that optical elements 114 may be of a diffractive or refractive material, such as a diffraction grating or prism, respectively. Applicator 116, shown here as a brush, may be of alternative design, as necessary to apply the pigmented medium to the desired surface. Applicators such as a spray mechanism, spatula, roller, chalk piece, marker, crayon, etc. are contemplated. Pigmented medium 122 is shown here enclosed in receptacle 118 having lid 120. As can be seen in FIG. 1, it is contemplated that a plurality of receptacles containing a variety of pigmented media may be provided, wherein each receptacle may contain a pigmented medium of a different color. Each receptacle 118 may be removably attached to backing 110 by adhesive or other means. The preferred pigmented medium shown in FIG. 1 consists of poster paints, which can be applied to a surface by applicator 116.

An important feature of the present invention is the use of pigmented media having luminescent, especially fluorescent, properties. As discussed above, it has been found that the use of fluorescent colors (or luminescent materials displaying a greater perceived brightness of color, as do fluorescent materials) results in a high degree of three dimensional separation and depth of an image drawn therewith.

Figure 2:
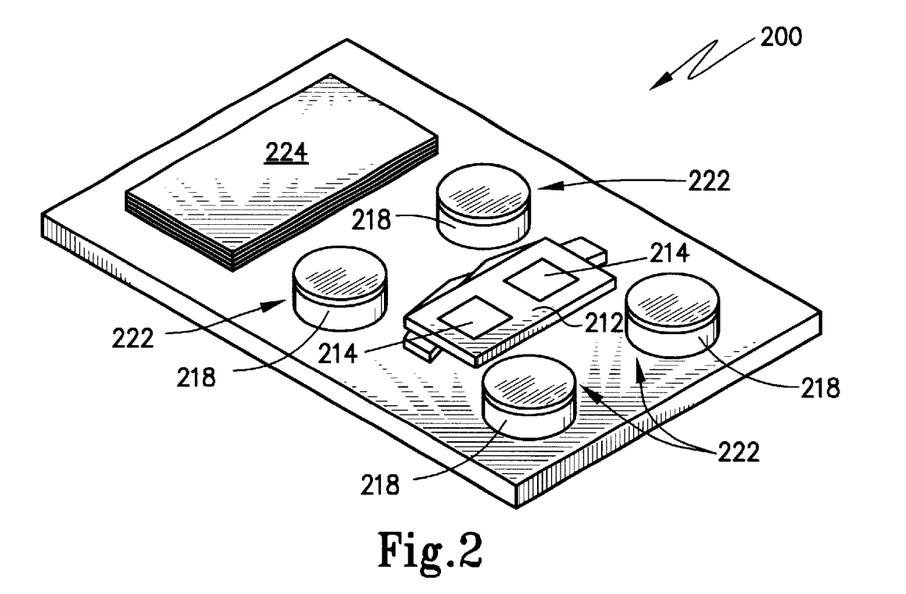
FIG. 2 is a perspective view showing a second exemplary embodiment of the creative art kit according to the present invention.

FIG. 2 shows a second exemplary embodiment of kit 200 including booklet 224, pigmented medium 222 and viewer 212. Booklet 224 may include instructions and stencils. Pigmented medium 222 is enclosed in receptacle 218 having an alternative shape to that shown in FIG. 1. Here, pigmented medium consists of finger paints to be applied to a surface by wiping with one's fingers. Accordingly, kit 200 does not include an applicator 116.

Figure 3:
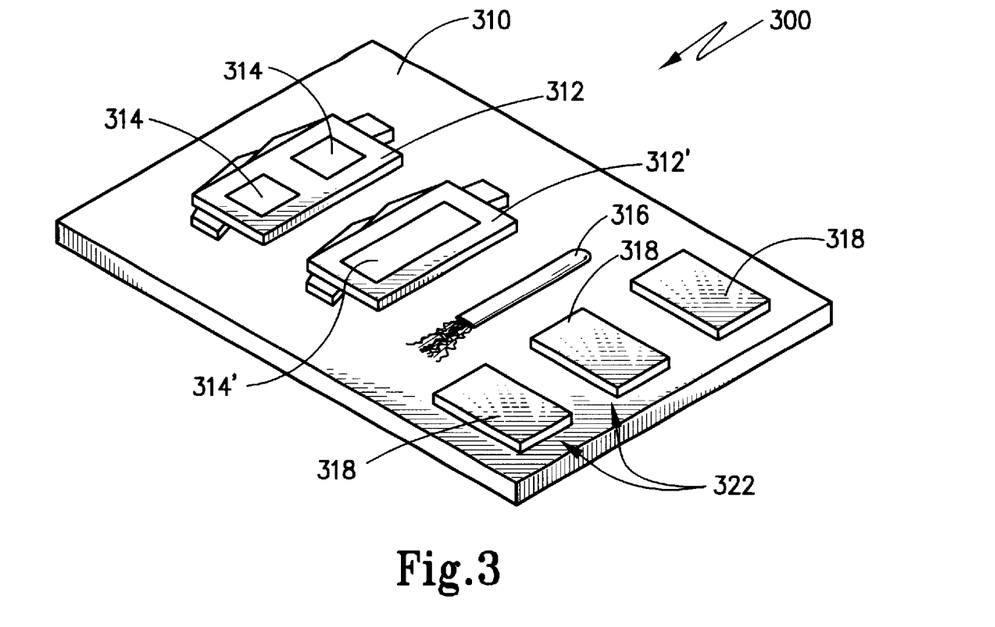
FIG. 3 is a perspective view of a third exemplary embodiment of the creative art kit according to the present invention.

FIG. 3 shows a third exemplary embodiment of creative art kit 300. Here, two versions of viewers, 312 and 312; are shown, wherein a first version 312 includes two optical elements 314, whereas a second version 312' includes a single optical element 314'. Applicator 316 is a thickly bristled brush for applying pigmented medium 322 to a surface. Here, pigmented medium is a chalk or dust powder. The chalk or dust powder may be applied directly to a surface, or may be mixed with a liquid such as water to create a flowable paint-like substance for application to the surface with applicator 316. Here, receptacles 318 comprise plastic or other material fixedly attached to backing 310 so as to form a compartment for containing pigmented medium 322.

Figure 4:
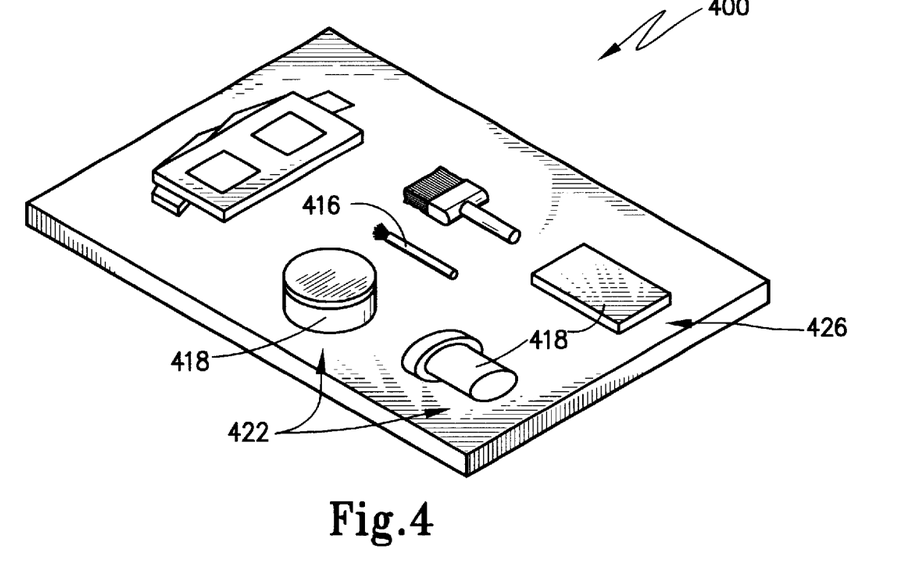
FIG. 4 is a perspective view of a fourth exemplary embodiment of the creative art kit according to the present invention.

FIG. 4 shows a fourth exemplary embodiment of creative art kit 400, wherein a variety of elements are included. Here, applicators 416 and 416' are shown in two different varieties having different brush sizes to allow more flexible means for application of pigmented medium 422 and non-luminescent pigmented medium 426 as desired to a surface. Receptacles 418 are shown as a variety of types. Pigmented medium 422 may also be of a variety of types, including finger paints, poster paints, chalk and dust. Other types of pigmented medium are contemplated such as crayons, markers, etc. It should be noted that in this embodiment, non-luminescent pigmented medium 426 is included for application to a surface in addition to pigmented medium 422.

Figure 5:
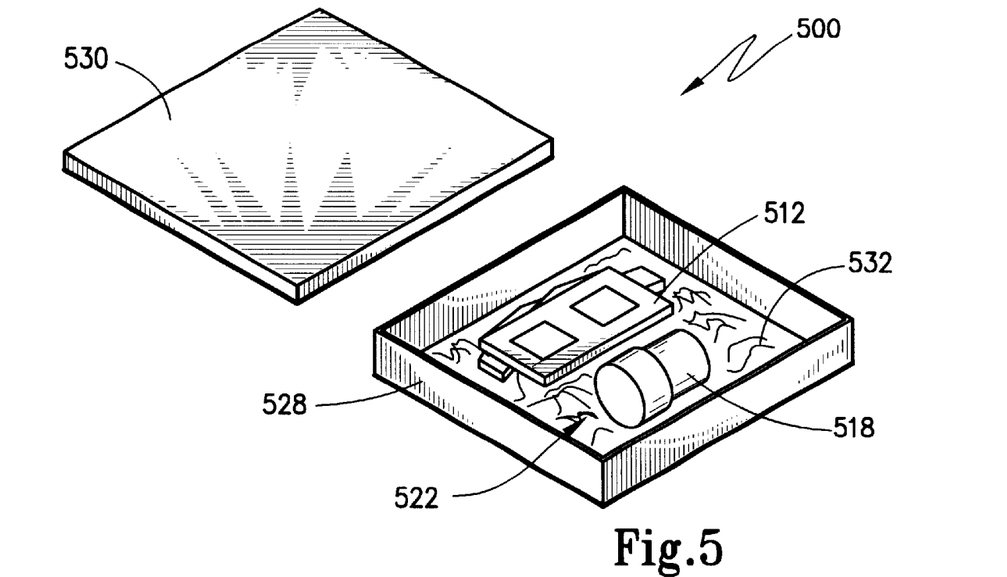
FIG. 5 is a perspective view of a fifth exemplary embodiment of the creative art kit according to the present invention.

FIG. 5 shows a fifth exemplary embodiment of creative art kit 500. Here, creative art kit 500 is disposed in box 528 having box lid 530. In this embodiment, a single receptacle 518 containing pigmented medium 522 and a single viewer 512 are disposed in kit 500. Packing material 532 surrounds receptacle 518 and viewer 512 to maintain the position thereof in box 528. Packing material 532 may be of any type desired, such as styrofoam, paper, cardboard, plastic etc. It is contemplated that an instruction book or stencils may be included in box 528. Alternatively, instructions may be written on the inside or outer portions of box 528 or box lid 530. Stencils may be further included as part of box 528 or box lid 530 as potential cut-out portions thereof.

Figure 6:
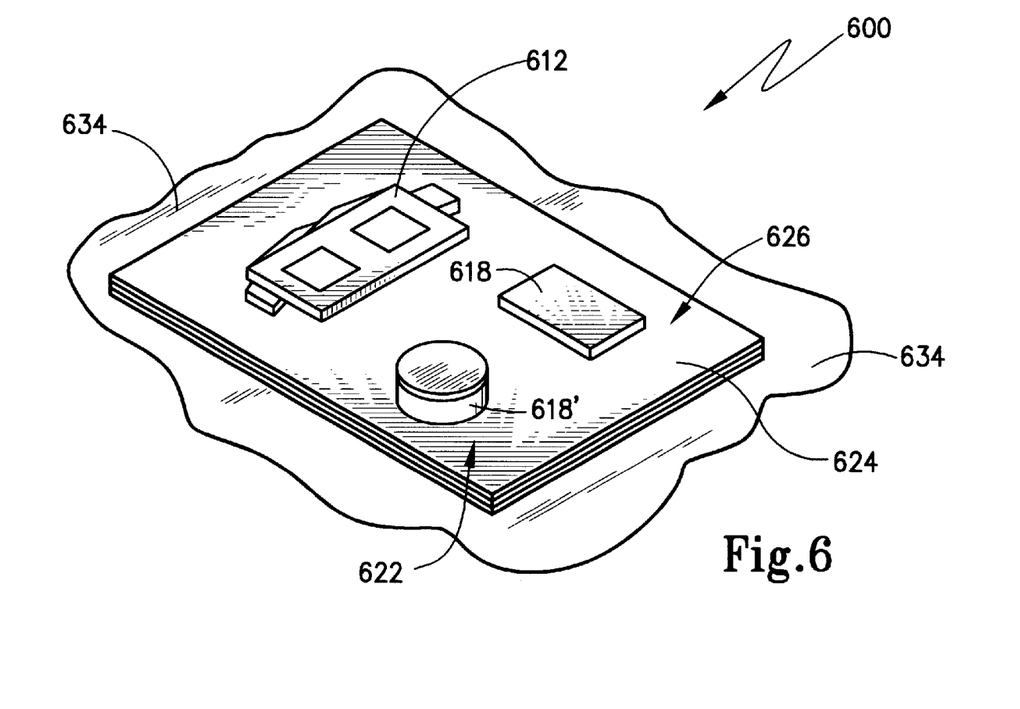
FIG. 6 is a perspective view of a sixth exemplary embodiment of the creative art kit according to the present invention.

FIG. 6 shows a sixth exemplary embodiment of creative art kit 600. Here, creative art kit 600 is disposed in shrink-wrap 634. Viewer 612, booklet 624 and receptacles 618, and 618' which can include both pigmented medium 622 and non-luminescent pigmented medium 626, are enclosed in shrink-wrap 634. Again, booklet 624 may include instructions and stencil sheets. It should be understood from this and other embodiments that a variety of packaging methods are contemplated for creative art kit 600.

Figure 7:
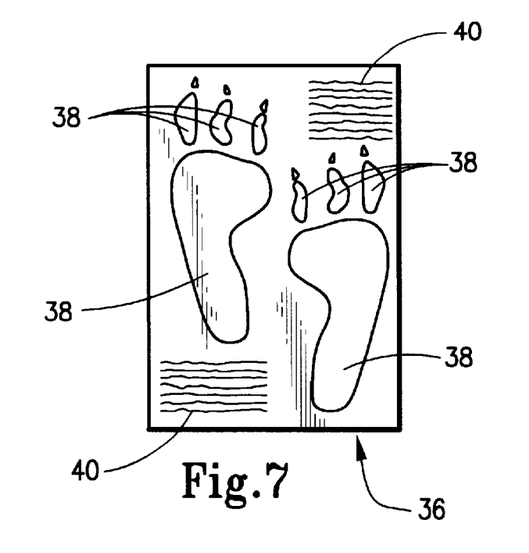
FIG. 7 is a top plan view of a stencil sheet according to the present invention.

FIG. 7 shows an exemplary stencil sheet 36 having cut-out regions 38 and instructions 40 written on stencil sheet 36. Cut-out regions 38 may be pre-cut, perforated for tearing or cutting out, or line drawn requiring a person to use scissors to obtain the stencil. Cut-out regions 38 define a selected design in stencil sheet 36. Instructions 40 may be printed on either side of stencil sheet 36, providing instruction as to a method for using creative art kit 100 for use in producing and viewing stereoscopic creative art images having a design as displayed in stencil sheet 36, as well as designs of the person's own making. It should be understood that stencil sheet 36 need not have instructions 40 included thereon.

The present invention is also directed toward a method for producing and viewing stereoscopic creative art images, including the steps of applying at least one pigmented medium for a chosen color to a surface in a selected design, where the pigmented medium includes a luminescent material as a component thereof, and viewing the surface and design through a viewer having a viewer portion which is operative to impart an angular deviation to light of a chosen color passing through the viewing portion. It is preferred that the luminescent material is a fluorescent material. Preferably, the method is accomplished by applying the pigmented medium to the surface by brushing, wiping with one's fingers, or spraying the pigmented medium onto the surface. Other methods of application are contemplated, as are appropriate to the type and form of the pigmented medium. Further, the pigmented medium may be in a powdered form which is mixed with a liquid component to produce a flowable compound prior to applying the pigmented medium to the surface.

It is further contemplated that the surface upon which the image is formed can be either a luminescent surface itself or a non-luminescent surface that contrasts in color with the pigmented medium. The luminescent surface may result from a previous application of a luminescent material to a non-luminescent surface, or from the use of a material having luminescent properties itself. It is also contemplated that the method includes applying two or more pigmented media having luminescent material as a component thereof, where each of the pigmented media have a different color. It should also be understood that additional pigmented media having still different colors may be applied to the design.

It is further contemplated that the method includes creating an image by applying a pigmented medium to the surface in a selected design wherein at least one portion of the design to be viewed is color coded according to the desired depth appearance of that portion with respect to the remaining portions of the design. This color coding may be accomplished by applying a colored pigmented medium having a color tending toward the red end of the spectrum to portions of the design which are to appear less distant to the viewer and by applying a colored pigmented medium having a color tending toward the blue end of the spectrum to portions of the design which are to appear more distant to the viewer. The colored pigmented medium may have a color which can be yellow, red, pink, orange, blue, purple, or green. Alternative variations on these colors or additional colors, however, are contemplated.

Figure 8:
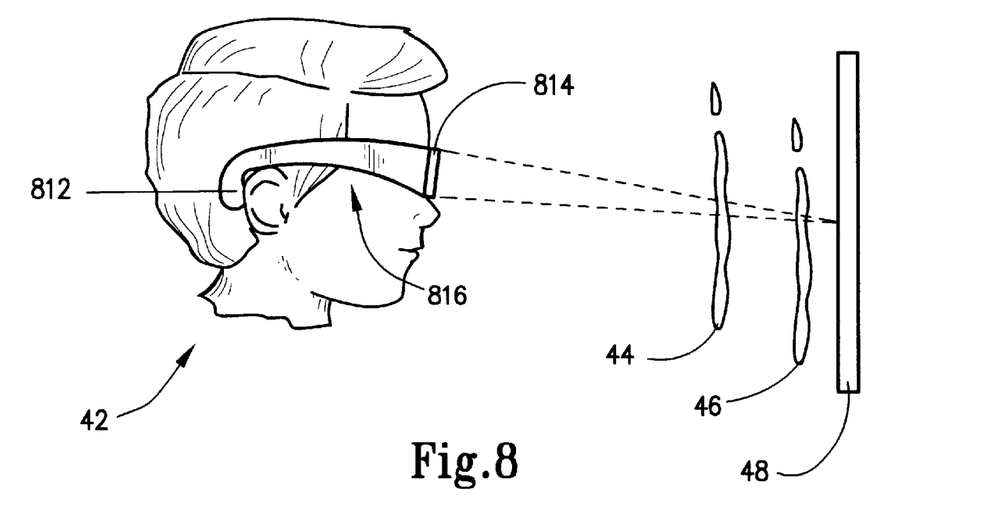
FIG. 8 is a side view in elevation illustrating the method and system according to the present invention.
Figure 9:
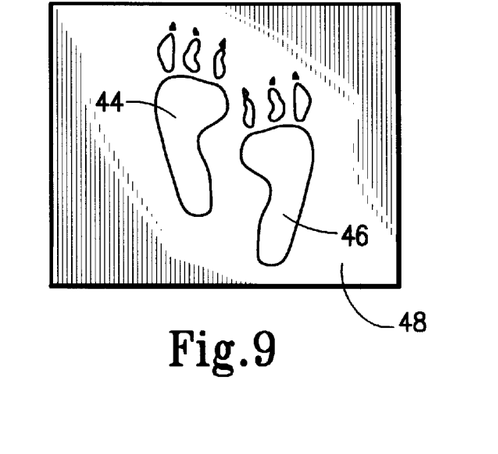
FIG. 9 is a top plan view of a design image on a surface, created using the stencil of FIG. 7.

FIGS. 8 and 9 show the preferred method for producing and viewing stereoscopic creative art images, as well as a preferred system for viewing such images, according to the present invention. Here, surface 48 can be of a luminescent or non-luminescent color, which may contrast with first colored portion 44 and second colored portion 46. Here, luminescent, preferably fluorescent, first colored portion 44 and luminescent, preferably fluorescent, second colored portion 46 have been shown to produce a greater degree of three-dimensional perception than does a non-luminescent image. Person 42 paints first colored portion 44 and second colored portion 46 onto surface 48. In the drawings shown, person 42 has drawn first colored portion 44 and second colored portion 46 using stencil sheet 36 as shown in FIG. 7, by applying a pigmented medium over stencil sheet 36 to transfer the selected design to surface 48. Person 42 views surface 48 through viewer 812 having optical element 814. Together, viewer 812 and optical element 814 may comprise viewing apparatus 816.

It should be appreciated from FIGS. 8 and 9 that any variety of luminescent and non-luminescent colors may be used to create an image on surface 48. Further, surface 48 may be colored any variety of luminescent or non-luminescent colors. The use of colors such as white and black is contemplated. It should further be appreciated that any portion of an image to be viewed may be color-coded according to the desired depth appearance of that portion relative to other portions. The use of contrasting luminescent colors from relatively opposite ends of the visible spectrum in combination is highly effective in presenting a great degree of depth perception and color separation.

It can be seen in FIG. 8 that first colored portion 44 appears closer to optical element 814 than does second colored portion 46, because first colored portion 44 is of a color tending toward the relative red end of the visible spectrum, whereas second colored portion 46 is of a color tending toward the relative blue end of the visible spectrum. It should be appreciated that this depth appearance may be reversed by choosing different colors for first colored portion 44 or second colored portion 46, or by using a viewing apparatus designed to reverse the depth appearance of relative red-tending and blue-tending colors, as discussed above. Both first colored portion 44 and second colored portion 46 appear to float over surface 48. It should also be appreciated that, depending upon the selection of color for surface 48, first colored portion 44 or second colored portion 46 may appear to float behind surface 48. That is, surface 48 may appear closer to optical element 814 than do either first colored portion 44 or second colored portion 46, or both. It should also be appreciated that first colored portion 44 or second colored portion 46 may be further divided into additional portions by coloring each colored portion with multiple regions of different colors.

It should be appreciated that optical element 814 is operative to impart an angular deviation to light of a chosen color passing through optical element 814. Light of a first chosen color is angularly deflected relative to light of a second chosen color, so as to impart to a person an appearance of depth to the first chosen color relative to the second chosen color.

It should be noted that red-tending colors appear closer to optical element 814 and blue-tending colors appear further from optical element 814, given the relative angular deflection of the various wavelengths associated therewith. Optical element 814 may be modified, however, as taught in the Steenblik patents, to make red-tending colors appear further from optical element 814 and blue-tending colors appear nearer to optical element 814.

As discussed above, red-tending colors may include the colors yellow, red, pink and orange, and other colors tending toward the red portion of the visible spectrum and including any colors which similarly appear closer to viewer 814 when viewed therethrough. Blue-tending colors may include blue, purple and green, and likewise other colors tending toward the blue portion of the visible spectrum and including any colors which similarly appear further from optical element 814 when viewed therethrough. It should be noted that colors having a greater degree of contrast appear to provide a higher perception of three-dimensional separation. Further, colors having a high degree of contrast with the color of the surface also give a greater perception of three-dimensional separation.

An image may be color coded according to the desired depth appearance of a portion of the image. A portion of the image which is to appear less distant to the optical element should be colored with a red-tending colored luminescent, preferably fluorescent, material, whereas a portion of the image which is to appear more distant to the optical element should be colored with a blue-tending colored luminescent, preferably fluorescent, material. Again, however, the optical element 814 may be modified to reverse the relative depth appearance of red and blue colors, and this should be taken into account when creating images to be viewed with such a modified optical element.

In addition, the present invention is directed to a system for viewing stereoscopic images that includes an image to be viewed which has at least one luminescent colored portion, and a viewing apparatus for viewing the image wherein the viewing apparatus is operative to angularly deflect light of a first chosen color relative to light of a second chosen color, so as to impart to a person viewing the image through the viewing apparatus an appearance of depth to the first chosen color relative to the second chosen color. It is preferred that the luminescent colored portion is a fluorescent colored portion.

Preferably, the viewing apparatus comprises an eyeglass frame supporting a high efficiency diffraction grating, and the image has a plurality of luminescent colored portions.

The image may be colored the first chosen color and the surface upon which the image exists may be colored the second chosen color. The luminescent colored portion of the image would then appear at a depth different from the surface on which the image is drawn.

Further, it is contemplated that the image itself may include multiple luminescent colored portions. Portions of the image to appear nearer to the viewing means are colored a luminescent color tending toward the relative red end of the visible spectrum. Portions of the image to appear further from the viewing means are colored a luminescent color tending toward the relative blue end of the visible spectrum. Portions of the image to appear at a relatively intermediate distance to the viewing means are colored a luminescent color tending toward the relative middle of the visible spectrum. Again, it should be appreciated that the viewing apparatus may be constructed so as to reverse this perceived depth relationship of red-tending and blue-tending colors. Further, it is contemplated that the surface or the luminescent colored portion of the image may be a luminescent white color.

Finally, it is contemplated that the image or surface may include at least one non-luminescent colored portion. Preferably, the non-luminescent colored portion has a high degree of contrast to the luminescent portions.

Accordingly, the present invention has been described with some degree of particularity directed to the exemplary embodiment(s) of the present invention. It should be appreciated, though, that the present invention is defined by the following claims construed in light of the prior art so that modifications or changes may be made to the exemplary embodiment of the present invention without departing from the inventive concepts contained herein.

I claim:

1. A creative art kit adapted for use in producing and viewing stereoscopic images, comprising:
   (a) a pigmented medium of a first color adapted to be applied to a surface of a second color different from said first color to produce images, said pigmented medium including a luminescent material as a component thereof; and (b) a viewer through which a user may observe the images, said viewer including an optical element operative under ambient lighting to disperse wavelengths of light passing therethrough at different dispersion angles dependent upon the spectral position of each wavelength.

2. A creative art kit according to claim 1 wherein the luminescent material is selected from a group consisting of fluorescent, phosphorescent, photoluminescent, electroluminescent, chemoluminescent, and bioluminescent.

3. A creative art kit according to claim 1 wherein the luminescent material is a fluorescent material.

4. A creative art kit according to claim 1 including an applicator operative to apply the pigmented medium to a chosen surface.

5. A creative art kit according to claim 4, wherein the applicator is a brush of a selected bristle configuration.

6. A creative art kit according to claim 1 including a stencil having a selected design therein whereby said pigmented medium can be applied over said stencil to transfer the selected design to the surface.

7. A creative art kit according to claim 1 wherein said viewer includes an eyeglass frame operative to support said optical element.

8. A creative art kit according to claim 1 wherein said optical element is selected from a group consisting of a diffractive element and a refractive element.

9. A creative art kit according to claim 1 including a plurality of pigmented media having different colors, and where each pigmented medium includes a luminescent material as a component thereof.

10. A creative art kit according to claim 9 wherein a first one of said different colors is selected from the group consisting of yellow, red, pink and orange and wherein a second one of said different colors is selected from the group consisting of blue, purple, and green.

11. A creative art kit according to claim 1, wherein the pigmented medium is selected from a group consisting of finger paint, poster paint, colored chalk and colored dust.

12. A creative art kit according to claim 1 including a non-luminescent pigmented medium.

13. A creative art kit according to claim 1 including instructions teaching a method for producing and viewing stereoscopic creative art images.

14. A method for producing and viewing stereoscopic creative art images, comprising the steps of:
(a) applying a first pigmented medium of a chosen color to a surface of a different color in a selected design, said first pigmented medium including a luminescent material as a component thereof; and
(b) viewing the surface and the design of the first pigmented medium through a viewer having a viewing portion operative under ambient lighting to impart an angular deviation to light of the chosen color passing therethrough.

15. A method according to claim 14 wherein the luminescent material is selected from a group consisting of fluorescent, phosphorescent, photoluminescent, electroluminescent, chemoluminescent, and bioluminescent.

16. A method according to claim 14 wherein the luminescent material is a fluorescent material.

17. A method according to claim 14 wherein the step of applying the first pigmented medium is accomplished by brushing the first pigmented medium onto the surface.

18. A method according to claim 14 wherein the step of applying the first pigmented medium is accomplished by wiping the first pigmented medium onto the surface with a finger.

19. A method according to claim 14 wherein the step of applying the first pigmented medium is accomplished by spraying the first pigmented medium onto the surface.

20. A method according to claim 14 wherein the first pigmented medium is in a powdered form, and including the step of mixing the first pigmented medium with a liquid component to produce a flowable compound prior to applying the first pigmented medium to the surface.

21. A method according to claim 14 wherein the surface is a luminescent surface that contrasts in color with the pigmented medium.

22. A method according to claim 14 wherein the surface is a non-luminescent surface that contrasts in color with the first pigmented medium.

23. A method according to claim 14 including the step of applying a second pigmented medium that includes a luminescent material as a component thereof to the surface wherein the second pigmented medium has a color different from said first pigmented medium.

24. A method according to claim 23, wherein the first pigmented medium has a color chosen from a group consisting of yellow, red, pink and orange, and the second pigmented medium has a color chosen from a group consisting of blue, purple and green.

25. A system for viewing stereoscopic images, comprising:
(a) an image to be viewed having at least one luminescent colored portion of a first chosen color, said image residing on a surface of a second chosen color; and
(b) a viewing apparatus for viewing the image, wherein the viewing apparatus is operative under ambient lighting to angularly deflect light of the first chosen color relative to light of the second chosen color, so as to impart to a person viewing the image an appearance of depth to the first chosen color relative to the second chosen color.

26. A system according to claim 25 wherein the luminescent colored portion is selected from a group consisting of fluorescent, phosphorescent, photoluminescent, electroluminescent, chemoluminescent, and bioluminescent.

27. A system according to claim 25 wherein the luminescent colored portion is a fluorescent colored portion.

28. A system according to claim 25 wherein said luminescent colored portion of the image appears to a person viewing the image to be at a depth different from the surface.

29. A system according to claim 25, wherein a portion of the image to appear nearer to the viewing apparatus is colored a luminescent color tending toward the red portion of the visible spectrum, and wherein a portion of the image to appear further from the viewing apparatus is colored a luminescent color tending toward the blue portion of the visible spectrum.

30. A system according to claim 25, wherein the image includes at least one non-luminescent portion.

31. A system for viewing stereoscopic images, comprising:
(a) an image to be viewed having at least one luminescent colored portion of a first chosen color, said image residing on a surface of a second chosen color; and
(b) a viewing apparatus for viewing the image, wherein the viewing apparatus is operative to angularly deflect light of the first chosen color relative to light of the second chosen color, so as to impart to a person viewing the image an appearance of depth to the first chosen color relative to the second chosen color.

32. A system for viewing stereoscopic images, comprising:

(a) an image to be viewed having at least one luminescent colored portion; and (b) a viewing apparatus for viewing the image, wherein the viewing apparatus is operative under ambient lighting to angularly deflect light of a first chosen color relative to light of a second chosen color, so as to impart to a person viewing the image an appearance of depth to the first chosen color relative to the second chosen color.

33. A method for producing a stereoscopic creative art image and viewing the image under ambient lighting, comprising the steps of:

(a) applying a first pigmented medium of a chosen color to a surface of a different color in a selected design thereby to create the image, said first pigmented medium including a luminescent material as a component thereof; and (b) viewing the image under said ambient lighting through a viewer having a viewing portion operative upon viewing the image to impart an angular deviation to light of the chosen color passing through said viewer.

* * * * *